United States Patent
White et al.

(10) Patent No.: US 9,790,995 B2
(45) Date of Patent: Oct. 17, 2017

(54) BEARING SEAL WITH INTEGRATED GROUNDING BRUSH

(71) Applicant: Schaeffler Technologies AG & Co. KG, Herzogenaurach (DE)

(72) Inventors: Michael White, Lake Wylie, SC (US); Kunal Kalia, Charlotte, NC (US); Scott Hart, Sharon, SC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 102 days.

(21) Appl. No.: 14/886,430

(22) Filed: Oct. 19, 2015

(65) Prior Publication Data
US 2017/0108047 A1    Apr. 20, 2017

(51) Int. Cl.
| | |
|---|---|
| *F16C 33/76* | (2006.01) |
| *F16C 41/00* | (2006.01) |
| *F16C 33/82* | (2006.01) |
| F16C 19/06 | (2006.01) |
| F16C 33/78 | (2006.01) |

(52) U.S. Cl.
CPC .............. *F16C 33/82* (2013.01); *F16C 19/06* (2013.01); *F16C 33/7856* (2013.01)

(58) Field of Classification Search
CPC ...... F16C 19/06; F16C 19/52; F16C 33/7856; F16C 33/7889; F16C 41/002
See application file for complete search history.

(56) References Cited

U.S. PATENT DOCUMENTS

| | | | |
|---|---|---|---|
| 3,564,477 A | * | 2/1971 | Pompei ............... F16C 33/7843 439/17 |
| 3,994,545 A | | 11/1976 | Van Dorn |
| 5,139,425 A | | 8/1992 | Daviet et al. |
| 6,142,673 A | | 11/2000 | Kottritsch et al. |
| 7,136,271 B2 | | 11/2006 | Oh et al. |
| 7,193,836 B2 | | 3/2007 | Oh et al. |

(Continued)

FOREIGN PATENT DOCUMENTS

| | | | | |
|---|---|---|---|---|
| JP | 09310721 A | * | 12/1997 | ............ F16C 33/303 |
| SE | EP 0787915 A1 | * | 8/1997 | ............ F16C 33/303 |
| WO | 2009056098 A1 | | 5/2009 | |

OTHER PUBLICATIONS

Technical Bulletin. Pro Tech SG Bearing Isolators. Parker Hannifin Corporation, Cleveland, OH. dated 2006.

(Continued)

*Primary Examiner* — Phillip A Johnson
(74) *Attorney, Agent, or Firm* — Volpe and Koenig, P.C.

(57) ABSTRACT

A rolling bearing assembly with electrical discharge damage protection is provided. The assembly includes a seal extending radially between a radially outer bearing ring and a radially inner bearing ring. The seal includes a fixed seal end that is fixed to one of the radially inner or outer bearing rings and a flexible sealing lip that contacts the other one of the radially inner or outer bearing rings. At least one electrically conductive ring includes a first ring end that contacts one of the radially inner or outer bearing rings at the fixed seal end. The seal is integrally connected to the at least one electrically conductive ring. Electrically conductive brush filaments are fixed to the at least one electrically conductive ring, and the brush filaments contact the other one of the radially inner or outer bearing rings opposite from the fixed seal end.

12 Claims, 2 Drawing Sheets

(56) References Cited

U.S. PATENT DOCUMENTS

| | | |
|---|---|---|
| 7,498,703 B2 | 3/2009 | Rea et al. |
| 7,878,814 B2 | 2/2011 | Chin et al. |
| 8,169,766 B2 | 5/2012 | Oh et al. |
| 8,199,453 B2 | 6/2012 | Oh et al. |
| 8,248,725 B2 | 8/2012 | Hendriks et al. |
| 8,432,659 B2 | 4/2013 | Oh et al. |
| 2004/0233592 A1 | 11/2004 | Oh et al. |
| 2006/0007609 A1 | 1/2006 | Oh et al. |
| 2008/0157478 A1* | 7/2008 | Ishida ............... F16J 15/3232 277/353 |
| 2010/0195946 A1 | 8/2010 | Zhou et al. |
| 2011/0129176 A1 | 6/2011 | Koma et al. |
| 2011/0317953 A1 | 12/2011 | Moratz |
| 2012/0119448 A1 | 5/2012 | Stewart et al. |
| 2013/0301971 A1 | 11/2013 | Cudrnak et al. |
| 2014/0334758 A1 | 11/2014 | White |
| 2016/0215824 A1* | 7/2016 | Gezault ............... F16J 15/3204 |

OTHER PUBLICATIONS

Complete Shaft Grounding Solutions—INPRO/SEAL A Dover Company. Date Unknown (admitted prior art).
SKF Shaft Grounding Ring Kits TKGR series. dated Apr. 2012.
Shaft Grounding. Electro Static Technology—ITW—AEGIS Bearing Protection Ring—Patented Technology. dated 2009.
Translation of WO 2009/056098 obtained Apr. 15, 2015.

\* cited by examiner

BEARING SEAL WITH INTEGRATED GROUNDING BRUSH

FIELD OF INVENTION

This application is generally related to a rolling bearing and more particularly related to electrical discharge damage protection for a rolling bearing.

BACKGROUND

Rolling bearings are widely used in various mechanical applications, including automotive and industrial applications. Grounding devices are used in a variety of bearing applications, including AC or DC electrical motors, generators, and other applications having rotating shafts. In these applications, the grounding devices are used to prevent shaft induced currents from causing electrical discharge machining (EDM) due to electrical currents passing through a rolling bearing component. EDM causes pitting, fluting, and fusion craters on the rolling bearing components resulting in premature rolling bearing failure. Known EDM prevention methods include di-electric ceramic bearing coatings, Faraday shields, electrically conductive bearing grease, and shaft-contacting ground brushes.

Di-electric ceramic bearing coatings include a hard brittle coating that can fracture during installation or in use. Cracks in the coating allows current to pass through the bearing which results in EDM. Di-electric ceramic bearing coatings also have limited di-electric strength and at high voltage potential, current can pass through the coating structure compromising the EDM protection of the coating. Faraday shields are also known, as disclosed in U.S. Pat. No. 7,878,814. Faraday shields are expensive to implement in most rolling bearing applications. Electrically conductive grease or liquid metal, such as disclosed in U.S. Pat. No. 8,248,725, are used to allow current to continuously pass through bearing surfaces to prevent arcing that causes EDM, but may contain elements such as copper, carbon, or phosphorous which can cause excessive wear on the bearing surfaces and lead to premature failure of the rolling bearing.

Spring loaded shaft grounding brushes are also known and allow a continuous flow of current to ground. Known grounding brushes are prone to excessive wear, material transfer, and oxide formation on the mating surface. These oxides may become a di-electric and may prevent effective current transfer from the shaft to the ground through the brushes. This can cause electrical arcing and lead to EDM damage of the shaft. Once the impedance of the shaft grounding brush exceeds the impedance of the bearings, the current can also seek ground through the bearings which can cause EDM damage to the bearings. Shaft grounding brushes may also vibrate due to imperfections in the shaft surface, i.e. an out of round condition. When the grounding brush momentarily loses contact with the shaft during vibration, the current can arc from the grounding brush to the shaft causing EDM damage. Alternatively, the current can flow through the bearings if the voltage potential is sufficiently high while the brush loses contact with the shaft during vibration. Traditional spring loaded shaft grounding brushes are prone to rapid and excessive wear and can ultimately lose contact with the shaft causing the current to seek ground through the bearing and causing EDM damage in the bearing. Known bearing assemblies with EDM protection include separately formed seal assemblies as part of the bearing to retain lubricant and prevent the ingress of debris, and separately mounted grounding brush assemblies, which require significant axial space and increases the overall space requirements of the rolling bearing assembly.

As explained above, known EDM protection for bearings are either too expensive, unreliable, too large, or can cause damage to the bearing components.

SUMMARY

An improved rolling bearing assembly with EDM protection is provided having a compact seal and brush arrangement. The rolling bearing assembly includes radially inner and outer bearing rings. The radially inner bearing ring includes a radially inner race and the radially outer bearing ring includes a radially outer race. A plurality of rolling elements are supported to roll on the radially outer race and the radially inner race. A seal extends radially between the radially outer bearing ring and the radially inner bearing ring. The seal includes a fixed seal end that is fixed to one of the radially inner or outer bearing rings and a flexible sealing lip that contacts the other one of the radially inner or outer bearing rings. At least one electrically conductive ring includes a first ring end that contacts the one of the radially inner or outer bearing rings at the fixed seal end. The seal is integrally connected to the at least one electrically conductive ring. Electrically conductive brush filaments are fixed to the at least one electrically conductive ring, and the brush filaments contact the other one of the radially inner or outer bearing rings opposite from the fixed seal end.

Preferred arrangements with one or more features of the invention are described below and in the claims.

BRIEF DESCRIPTION OF THE DRAWINGS

The foregoing Summary as well as the following Detailed Description will be best understood when read in conjunction with the appended drawings. In the drawings.

DETAILED DESCRIPTION OF THE PREFERRED EMBODIMENTS

Figure 1:
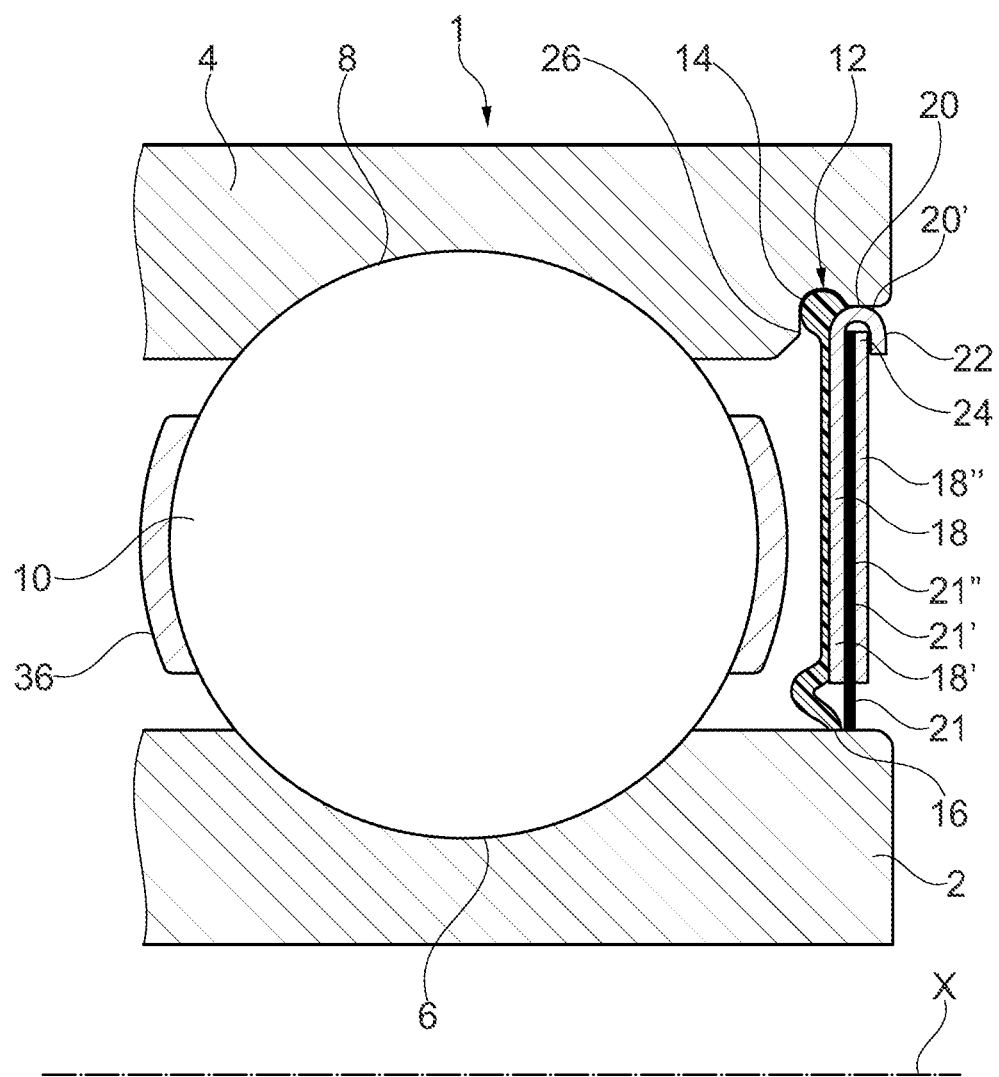
FIG. 1 is a cross-sectional view of a first embodiment of a rolling bearing assembly.

Certain terminology is used in the following description for convenience only and is not limiting. The words "inner," "outer," "inwardly," and "outwardly" refer to directions towards and away from the parts referenced in the drawings. A reference to a list of items that are cited as "at least one of a, b, or c" (where a, b, and c represent the items being listed) means any single one of the items a, b, c or combinations thereof. The terminology includes the words specifically noted above, derivates thereof, and words of similar import.

As shown in FIG. 1, a rolling bearing assembly 1 with electrical discharge damage protection is provided. The rolling bearing assembly 1 includes a radially inner bearing ring 2 and a radially outer bearing ring 4. The radially inner bearing ring 2 includes a radially inner race 6 and the radially outer bearing ring 4 includes a radially outer race 8. A plurality of rolling elements 10 are supported to roll on the radially outer race 8 of the radially outer bearing ring 4 and the radially inner race 6 of the radially inner bearing ring 2. As shown in FIG. 1, the roller assembly 1 preferably includes a cage 36 for the plurality of rolling elements 10.

A seal 12 extends radially between the radially outer bearing ring 4 and the radially inner bearing ring 2. The seal 12 includes a fixed seal end 14 that is fixed to one of the radially inner or outer bearing rings 2, 4 and a flexible sealing lip 16 that contacts the other one of the radially inner or outer bearing rings 2, 4. As shown in FIG. 1, the fixed seal end 14 is preferably fixed to the radially outer bearing ring 4 and the flexible sealing lip 16 contacts the radially inner bearing ring 2. However, one of ordinary skill in the art will recognize from the present disclosure that the fixed seal end 14 could be fixed to the radially inner bearing ring 2, and the flexible sealing lip 16 could contact the radially outer bearing ring 4.

At least one electrically conductive ring 18 includes a first ring end 20 that contacts one of the radially inner or outer bearing rings 2, 4 at the fixed seal end 14. The seal 12 is integrally connected to the at least one electrically conductive ring 18. Electrically conductive brush filaments 21 are fixed to the at least one electrically conductive ring 18, and the brush filaments 21 contact the other one of the radially inner bearing ring 2 or radially outer bearing ring 4 opposite from the fixed seal end 14. As shown in FIG. 1, the brush filaments 21 preferably contact the radially inner bearing ring 2. However, one of ordinary skill in the art will recognize from the present disclosure that the brush filaments 21 could contact the radially outer bearing ring 4.

The seal 12 is preferably molded onto the at least one electrically conductive ring 18. By molding the seal 12 with the at least one electrically conductive ring 18 to form one piece, the seal 12 is fully supported without extra reinforcements, and the overall axial profile of the rolling bearing assembly is decreased and its assembly is simplified. As shown in FIG. 1, the radially outer bearing ring 4 includes a groove 26. The fixed seal end 14 engages the groove 26 of the radially outer bearing ring 4. The seal 12 is preferably an elastomer comprised of a rubber or polymeric material. The at least one electrically conductive ring 18 is preferably comprised of a metallic material.

Still with reference to FIG. 1, the at least one electrically conductive ring 18 preferably comprises two of the electrically conductive rings 18', 18", with one of the two electrically conductive rings 18', 18" being located on both axial sides 21', 21" of the brush filaments 21. A first one of the two electrically conductive rings 18' includes the first ring end 20', and the first ring end 20' preferably includes an extension 22 that extends in an axial direction and contacts an axial end surface 24 of a second one of the two electrically conductive rings 18" facing away from the brush filaments 21. In this embodiment, the extension 22 of the first electrically conductive ring 18' contacts the radially outer bearing ring 4. One of ordinary skill in the art will recognize from the present disclosure that the configuration of the two electrically conductive rings 18', 18" could be varied depending on a particular application. As shown in FIG. 1, the brush filaments 21 are axially sandwiched between the two electrically conductive rings 18', 18" for approximately 80-90% of a radial extent of the brush filaments 21. An axial end of the brush filaments 21 contacting the radially inner bearing ring 2 is exposed, i.e. not sandwiched between the two electrically conductive rings 18', 18".

Figure 2:
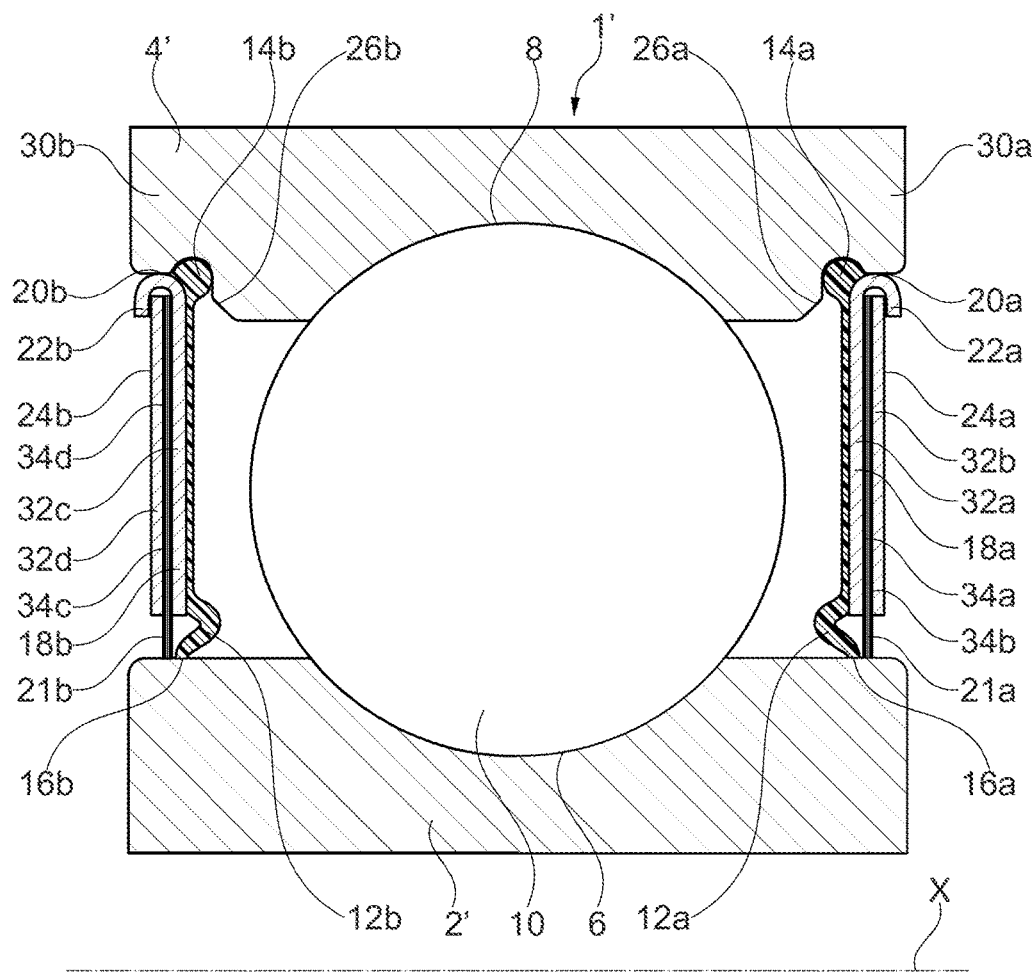
FIG. 2 is a cross-sectional view of a second embodiment of a rolling bearing assembly.

A second embodiment of the rolling bearing assembly 1' is shown in FIG. 2. The rolling bearing assembly 1' includes a radially outer bearing ring 4' with two grooves 26a, 26b, with one of the grooves 26a, 26b being located on each axial side 30a, 30b of the radially outer bearing ring 4'. In this embodiment, two of the seals 12a, 12b are provided, with the fixed seal ends 14a, 14b fixed to the radially outer bearing ring 4', and flexible sealing lips 16a, 16b contacting the radially inner bearing ring 2'. As shown in FIG. 2, one of the seals 12a, 12b is provided on each axial side of the rolling elements 10. The rolling bearing assembly 1' includes two electrically conductive ring 18a, 18b with a first ring end 20a, 20b that contacts the radially outer bearing ring 4' at the fixed seal end 14a, 14b of the seals 12a, 12b, with one of the electrically conductive rings 18a, 18b located on each axial side. The seals 12a, 12b are each integrally connected to a respective one of the electrically conductive rings 18a, 18b. Brush filaments 21a, 21b are fixed to each of the electrically conductive rings 18a, 18b, and the brush filaments 21a, 21b contact the radially inner bearing ring 2' opposite from the fixed seal end 14a, 14b of the seals 12a, 12b. The seals 12a, 12b are preferably molded onto the electrically conductive rings 18a, 18b in the same manner as discussed above. Preferably, each of the electrically conductive rings 18a, 18b comprises two of the electrically conductive rings 32a, 32b, 32c, 32d, with one of the two electrically conductive rings 32a, 32b, 32c, 32d being located on both axial sides 34a, 34b, 34c, 34d of the brush filaments 21a, 21b. A first one of the two electrically conductive rings 32a, 32c includes the first ring end 20a, 20b, and the first ring end 20a, 20b includes an extension 22a, 22b that extends in an axial direction and contacts an axial end surface 24a, 24b of a second one of the two electrically conductive rings 32b, 32d facing away from the brush filaments 21a, 21b.

Having thus described various embodiments of the present rolling bearing assembly in detail, it will be appreciated and apparent to those skilled in the art that many changes, only a few of which are exemplified in the detailed description above, could be made in the bearing assembly according to the invention without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

What is claimed is:

1. A rolling bearing assembly with electrical discharge damage protection, comprising:
   radially inner and outer bearing rings, the radially inner bearing ring including a radially inner race and the radially outer bearing ring including a radially outer race;
   a plurality of rolling elements supported to roll on the radially inner race of the radially inner bearing ring and the radially outer race of the radially outer bearing ring;
   a seal extending radially between the radially outer bearing ring and the radially inner bearing ring, the seal including a fixed seal end that is fixed to one of the radially inner or outer bearing rings and a flexible sealing lip that contacts the other one of the radially inner or outer bearing rings;
   at least one electrically conductive ring including a first ring end that contacts the one of the radially inner or outer bearing rings at the fixed seal end, the seal is integrally connected to the at least one electrically conductive ring; and
   electrically conductive brush filaments fixed to the at least one electrically conductive ring, the brush filaments contact the other one of the radially inner or outer bearing rings opposite from the fixed seal end on an axial side of the seal opposite from the radially inner race or radially outer race.

2. The rolling bearing assembly of claim 1, wherein the seal is molded onto the at least one electrically conductive ring.

3. The rolling bearing assembly of claim 1, wherein the seal comprises a rubber or polymeric body that extends between the radially inner bearing ring and the radially outer bearing ring.

4. The rolling bearing assembly of claim 1, wherein the at least one electrically conductive ring comprises a metallic material.

5. The rolling bearing assembly of claim 1, wherein at least one of the radially outer bearing ring or the radially inner bearing ring includes at least one groove.

6. The rolling bearing assembly of claim 5, wherein the fixed seal end engages the at least one groove of the radially outer bearing ring and the radially inner bearing ring.

7. The rolling bearing assembly of claim 6, wherein the brush filaments contact the radially inner bearing ring.

8. The rolling bearing assembly of claim 5, wherein the at least one groove comprises two grooves on the radially outer bearing ring, with one of the grooves being located on each axial side of the radially outer bearing ring, the at least one electrically conductive ring comprises two of the electrically conductive rings, and the seal includes two seals, each connected to respective ones of the electrically conductive rings, with the fixed seal end of each of the seals engaging respective ones of the grooves on the radially outer bearing ring, and respective ones of the electrically conductive brush filaments are connected to respective ones of the electrically conductive rings.

9. The rolling bearing assembly of claim 8, wherein one of the seals is provided on each axial side of the rolling bearing assembly.

10. The rolling bearing assembly of claim 1, wherein the rolling bearing assembly includes a cage for the plurality of rolling elements.

11. A rolling bearing assembly with electrical discharge damage protection, comprising:
    radially inner and outer bearing rings, the radially inner bearing ring including a radially inner race and the radially outer bearing ring including a radially outer race;
    a plurality of rolling elements supported to roll on the radially inner race of the radially inner bearing ring and the radially outer race of the radially outer bearing ring;
    a seal extending radially between the radially outer bearing ring and the radially inner bearing ring, the seal including a fixed seal end that is fixed to one of the radially inner or outer bearing rings and a flexible sealing lip that contacts the other one of the radially inner or outer bearing rings;
    at least one electrically conductive ring including a first ring end that contacts the one of the radially inner or outer bearing rings at the fixed seal end, the seal is integrally connected to the at least one electrically conductive ring; and
    electrically conductive brush filaments fixed to the at least one electrically conductive ring, the brush filaments contact the other one of the radially inner or outer bearing rings opposite from the fixed seal end, wherein the at least one electrically conductive ring comprises two electrically conductive rings, with one of the two electrically conductive rings being located on each axial side of the brush filaments.

12. The rolling bearing assembly of claim 11, wherein a first one of the two electrically conductive rings includes the first ring end, and the first ring end includes an extension that extends in an axial direction and contacts an axial end surface of a second one of the two electrically conductive rings facing away from the brush filaments.

\* \* \* \* \*